Oct. 23, 1962 W. C. TURNER ET AL 3,060,381

AUTOMATIC ATTENUATOR CONTROL

Filed June 2, 1960 2 Sheets-Sheet 1

INVENTORS
WILLIAM C. TURNER
ROBERT F. RIGGS

BY J. M. St. Amand
ATTORNEY

INVENTORS
WILLIAM C. TURNER
ROBERT F. RIGGS
BY
J. M. St. Amand
ATTORNEY 3,060,381
AUTOMATIC ATTENUATOR CONTROL William C. Turner, Ontario, Calif., and Robert F. Riggs, Charlottesville, Va., assignors to the United States of America as represented by the Secretary of the Navy Filed June 2, 1960, Ser. No. 33,606
3 Claims. (Cl. 325—362)
(Granted under Title 35, U.S. Code (1952), sec. 266)

The invention described herein may be manufactured and used by or for the Government of the United States of America for governmental purposes without the payment of any royalties thereon or therefor.

The present invention relates to an automatic attenuator system and more particularly to a technique for automatic attenuator protection of the first detector in ultra-high frequency receivers and the like.

Ordinarily, for ultra-high frequency radar receivers, which maintain a useful signal over a large dynamic range, to operate satisfactorily the target radar beam must maintain a fairly constant aspect with respect to the receiver. For the receiver to operate against a searching target radar, some sort of controlled attenuation at the receiver is required since rotation through nulls in the antenna pattern can cause a large drop in signal level. Various types of manual controlled attenuators are known, but these are unsatisfactory and they do not function automatically. An ideal attenuator would be controlled so that the RF power level at the mixer crystal of the receiver remains at a constant level, regardless of range or target factors. While a servo-operated continuously-variable attenuator controlled by the automatic-gain-control voltage level could provide this action, the mechanical limitations imposed by the need to follow very rapid level changes would require relatively complex and bulky equipment. The present attenuator system provides a simpler approach to the problem by providing at least one attenuator unit at the receiver input and switching between the attenuator unit and directly to the receiver automatically in accordance with preset limit values of the automatic gain control voltage. A microwave coaxial relay switch, when energized, connects the antenna to the receiver input through a unit of high attenuation; when de-energized connection is made through a unit of relatively small or no attenuation. This system controls a set of relays to cause attenuation of the signal input to the receiver when the signal voltage is too high. The present device provides automatic attenuator protection for first detectors, such as crystals or bolometers for example, in video amplifiers or for crystals used in mixers for IF receivers. The protection provided is against mixer limiting or crystal burn-out due to high power of the received energy.

It is an object of the invention, therefore, to provide a technique for automatic attenuator protection of the first detector in ultra-high frequency receivers.

Another object of the invention is to provide a novel system for a receiver or the like to prevent mixer limiting and crystal burn-out due to high power of received energy.

Still another object is to provide a novel automatic attenuator circuit for protecting first detectors such as crystals or bolometers in video amplifiers.

A further object of the invention is to provide a novel device for protecting crystals used in mixers for IF receivers.

A still further object is to provide a novel automatic attenuator control system.

Other objects and many of the attendant advantages of this invention will be readily appreciated as the same becomes better understood by reference to the following detailed description when considered in connection with the accompanying drawings wherein.

Referring now to the drawings, like numerals refer to like parts in each of the figures.

Figure 1:
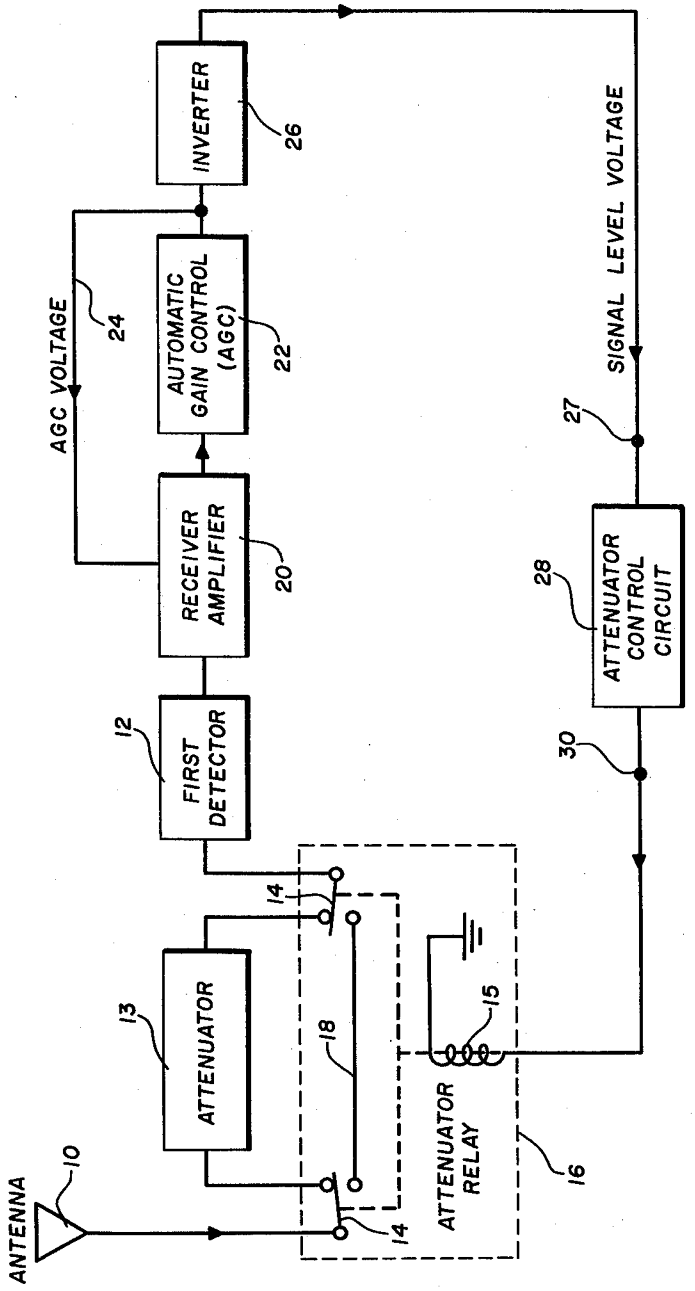
FIGURE 1 is a block diagram of a typical system circuit, of the present invention.

As illustrated in FIGURE 1 antenna 10 is connected to the first detector 12 through attenuator 13 and relay switches 14. In its initial position, at zero signal level voltage, or at low signal level voltage, the coil 15 of attenuator relay 16 is energized and switches 14 are swung over to connect antenna 10 with receiver 12 through line 18, by-passing attenuator 13. First detector 12 is connected to the receiver-amplifier circuit 20 which in turn is connected to the automatic-gain-control 22; a feedback line 24 connects the output of the automatic-gain-control 22 back to receiver-amplifier 20. Inverter 26 is also connected to the output of automatic-gain-control 22 and feeds the signal level voltage to the input terminal 27 of attenuator control circuit 28 whose output terminal 30 is connected to one side of coil 15 of the attenuator relay; the other side of coil 15 is connected to ground.

Figure 2:
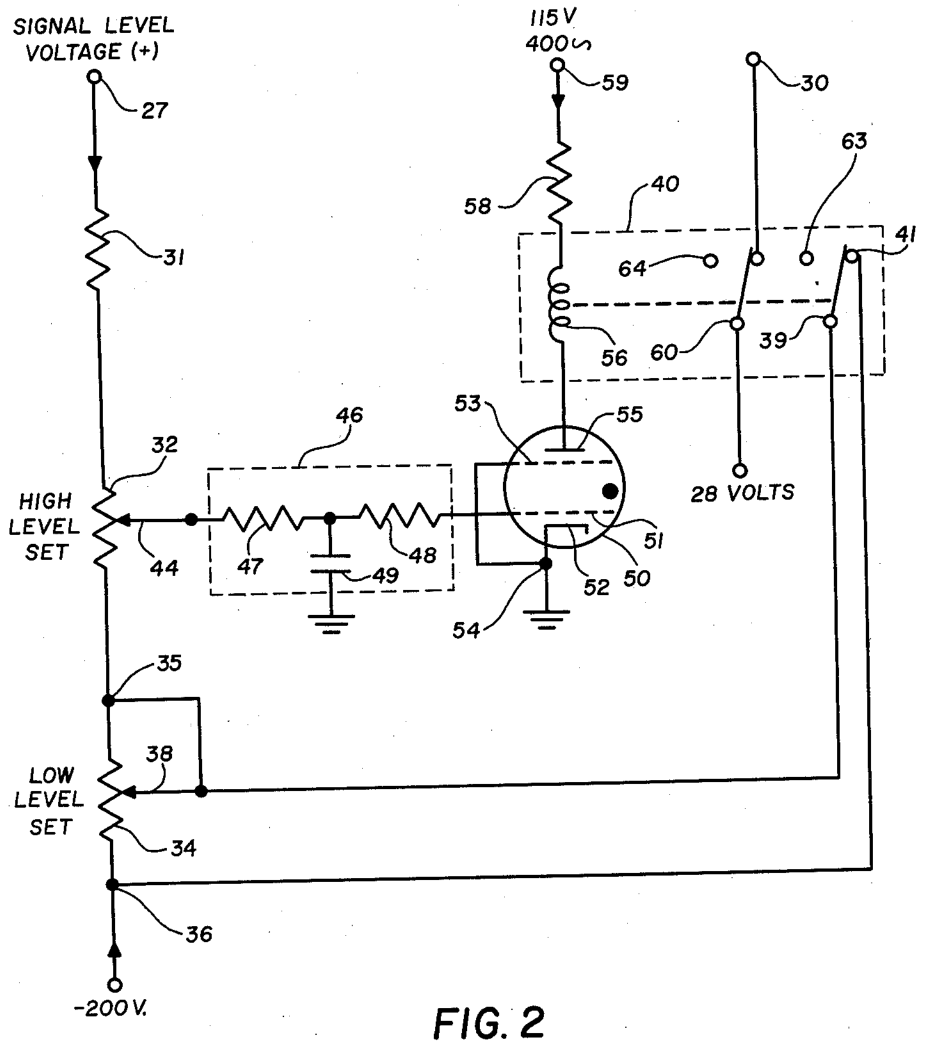
FIGURE 2 is a circuit diagram of a preferred embodiment of the automatic attenuator control circuit of the present invention.

The attenuator control circuit of FIGURE 2 shows terminal 27, where the signal level voltage is applied, connected through resistance 31 to one side of high level set potentiometer 32. The other side of potentiometer 32 is connected to one side of low level set potentiometer 34 at point 35. The other side of potentiometer 34 is connected at point 36 to a negative D.C. bias voltage, of —200 volts for example. The movable arm 38 of potentiometer 34 is connected to point 35 and to switch 39 of relay 40; point 36 is connected to terminal 41 of relay 40. Movable arm 44 of potentiometer 32 is connected through a filter circuit 46, comprising resistors 47 and 48 and capacitor 49 which is connected to ground, to grid 51 of a thyratron control tube 50. Cathode 52 and grid 53 of control tube 50 are connected together at point 54, and point 54 is in turn connected to ground; plate 55 is connected to one side of relay coil 56 of relay 40. The other side of relay coil 56 is connected through resistor 58 to a plate voltage source, 115 volts 400 cycles for example, at point 59. A bias power voltage, of 28 volts for example, is connected to switch 60 of relay 40; terminal 61 of the relay is connected to point 30, the output terminal of the attenuator control circuit, which is connected to the relay coil 15 of attenuator relay 16. Terminals 63 and 64 of relay 40 are open positions for switches 39 and 60, respectively, when coil 56 of relay 40 is energized.

In the operation of the system of FIGURE 1 the output of receiver 20 is fed to the automatic-gain-control 22 which in turn is fed back to the receiver in an inverse form, through feedback line 24, so that the receiver output is kept at a fixed level. The output voltage level of the AGC 22, therefore, is directly proportional although of opposite polarity to the input power level to receiver 20. The signal level output voltage from inverter 26 is the inverse and amplified AGC voltage, and is therefore directly proportional to the receiver input power level. The signal level voltage is fed to the attenuator control circuit 28 and when the receiver input signal reaches a predetermined level the signal level voltage is high enough to cause control circuit 28 to de-energize relay coil 15 and attenuator 13 will be switched in between receiving antenna 10 and first detector 12, as shown in FIGURE 1; then, the net gain of the receiver 20 immediately decreases and consequently the signal level voltage decreases. However, due to a proper choice of attenuator 13 and choice of switch-in and switch-out levels with respect to the receiver dynamic range, by means of potentiometers 32 and 34, it is necessary for the signal input power to further decrease before the attenuator is switched out.

The circuit diagram of a preferred embodiment of attenuator control circuit 28 used in the system of FIGURE 1 is shown in FIGURE 2. In the initial state, as shown in FIGURE 2, a bias power, of 28 volts for example, is applied to point 30 through switch 60 and contact 61; this bias power keeps coil 15 of relay 16 energized so that switches 14 keep line 18 connected into the circuit, of FIGURE 1, by-passing attenuator 13. Positive signal level voltage is impressed on the circuit at terminal 27 and through resistor 31. Potentiometer 32 reduces the change in voltage to a controllable range. Filter 46 prevents ionization of tube 50 due to fast fluctuation on the signal level voltage and also prevents grid current fluctuations from feeding back into the signal level circuitry.

At a high receiver signal level, and consequently a high signal level voltage, the control tube 50 will ionize and conduct at a desired signal level power and voltage selected by positioning arm 44 of the high level set potentiometer 32. At the selected voltage tube 50 will conduct and coil 56 of the control relay 40 will be energized moving switches 60 and 39 to respective open contacts 64 and 63. The opening of switch 60 when relay 40 is energized switches out the 28 volts bias power thus de-energizing attenuator relay 16 and switching in the protecting attenuator 13. At the same time, the opening of switch 39 when relay 40 is energized switches in potentiometer 34 adding more resistance to the circuit and decreasing the negative voltage at point 35. When switch 39 is closed with contact 41 the negative bias voltage, of −200 volts for example, applied at point 36 is applied at point 35; therefore, when the resistance of potentiometer 34 is added the negative bias at point 35 will be decreased, the amount depending upon the voltage drop across the low level set potentiometer determined by the setting of arm 38. This addition of extra resistance and resulting decrease of negative bias further increases the positive voltage on the tube control grid 51, keeping it ionized and offsetting any decrease in signal level voltage due to the net decrease in signal level when the attenuator 13 is switched into the system loop. The magnitude of the increased grid voltage is selected so that the received power and resulting signal level voltage has to decrease to a predetermined switch-out voltage before the control tube 50 will de-ionize. This switch-out voltage is selected by the low level set potentiometer 34. With de-ionization of tube 50 the attenuator 13 is removed from the receiver input by de-energizing relay 40 which activates relay 16; at the same time the additional resistance of potentiometer 34 is removed in the signal level voltage circuit to grid 51 of the control tube keeping it de-ionized and offsetting the change in signal level voltage due to the increase in net gain of receiver 20 resulting from attenuator switch-out. While potentiometers 32 and 34 are used to adjust the firing and cut-off levels for control tube 50, these levels must be chosen far enough apart so that oscillation will not occur. Briefly, the system operates as follows:

When the signal level is zero, control tube 50 is not conducting, control relay 40 is de-energized, the full negative bias at point 36 is applied to point 35, attenuator relay 16 is energized and attenuator 13 is out of the system. When the signal level is high, the control tube conducts, the control relay is energized, decreasing the negative bias at point 35 by adding the resistance of potentiometer 34, and de-energizing attenuator relay 16 which in turn switches-in attenuator 13 into the system. Then, when the signal level is low control tube 50 stops conducting and de-energizes relay 40, the full negative bias is applied at point 35, relay 16 is energized and attenuator 13 is switched-out of the system.

Obviously many modifications and variations of the present invention are possible in the light of the above teachings. It is therefore to be understood that within the scope of the appended claims the invention may be practiced otherwise than as specifically described.

What is claimed is:

1. An automatic attenuator control system for protecting first detectors and the like in high frequency receivers and amplifiers, comprising an antenna for receiving signals, a detector connected to a receiver-amplifier the output of which is fed to an automatic gain control whose output in turn is fed back to said receiver-amplifier, an inverter connected to the output of said automatic gain control, the signal level voltage output of said inverter being fed to an attenuator control circuit which in turn controls a means for automatically connecting said antenna directly to said detector when the signal level of desired signals received by said antenna is zero or reaches a predetermined low level and for connecting said antenna through an attenuator means to said detector when said signal level reaches a predetermined high level, said attenuator operable to protect said detector from burn-out due to high power of received energy, said attenuator control circuit consisting of a signal level voltage input terminal connected to one side of a high level set potentiometer the movable arm of which is connected through a filter circuit to the control grid of a thyratron tube, the other side of said high level set potentiometer being connected to one side of a low level set potentiometer and to its movable arm which in turn is connected through one switch of a relay means when de-energized to the other side of said low level set potentiometer which is also connected to a source of negative bias voltage, the anode of said thyratron being connected to an A.C. voltage source through said relay means control coil and the cathode of said thyratron being connected to ground, said relay coil operable to be energized when said thyratron tube conducts, a positive bias voltage connected through said relay means when de-energized to said means for automatically connecting said antenna to said detector, said thyratron conducting at a desired signal level voltage selected by positioning the movable arm of said high level set potentiometer, said low level potentiometer operable for selecting the low level of the signal level voltage at which said thyratron tube will no longer conduct and thus de-energize said relay means and by-pass said attenuator means.

2. A control system as in claim 1 wherein said filter circuit prevents ionization of said thyratron tube due to fast fluctuation of said signal level voltage and also prevents grid current fluctuations from feeding back into the circuitry of said signal level voltage.

3. A control system for automatic attenuator protection of detectors in high frequency receivers and amplifiers due to high power of received energy, comprising an antenna for receiving desired signals, a detector coupled to a receiver-amplifier, said antenna being automatically connected by control means to said detector directly when the level of said received energy is within a predetermined low level range and automatically connected to said detector by said control means through an attenuator when said received energy reaches a predetermined high level and again connected directly to said detector when reaching another predetermined low level, said control means being automatically responsive to the level of the received energy, said control means consisting of a signal level voltage input terminal connected to one side of a high level set potentiometer the movable arm of which is connected through a filter circuit to the control grid of a thyratron tube, the other side of said high level set potentiometer being connected to one side of a low level set potentiometer and to its movable arm which in turn is connected through one switch of a relay means when de-energized to the other side of said low level set potentiometer which is also connected to a source of negative bias voltage, the anode of said thyratron being connected to an A.C. voltage source through said relay means control coil and the cathode of said thyratron being connected to ground, said relay coil operable to be energized when said thyratron tube conducts, a positive bias voltage connected through said relay means when de-energized to said means for automatically connecting said antenna to said detector, said thyratron conducting at a desired signal level voltage selected by positioning the movable arm of said high level set potentiometer, said low level potentiometer operable for selecting the low level of the signal level voltage at which said thyratron tube will no longer conduct and thus de-energize said relay means and by-pass said attenuator.

References Cited in the file of this patent

UNITED STATES PATENTS

| | | |
|---|---|---|
| 2,323,626 | Sheffield | July 6, 1943 |
| 2,417,844 | Scully et al. | Mar. 25, 1947 |
| 2,685,001 | Darke | July 27, 1954 |